United States Patent
Wortberg

(10) Patent No.: US 9,780,464 B2
(45) Date of Patent: Oct. 3, 2017

(54) CONNECTOR WITH CLAMP ELEMENT

(71) Applicant: Lisa Draexlmaier GmbH, Vilsbiburg (DE)

(72) Inventor: Michael Wortberg, Dorfen (DE)

(73) Assignee: Lisa Draexlmaier GmbH, Vilsbiburg (DE)

( * ) Notice: Subject to any disclaimer, the term of this patent is extended or adjusted under 35 U.S.C. 154(b) by 272 days.

(21) Appl. No.: 14/644,875

(22) Filed: Mar. 11, 2015

(65) Prior Publication Data

US 2015/0263439 A1   Sep. 17, 2015

(30) Foreign Application Priority Data

Mar. 11, 2014   (DE) .................. 10 2014 003 113

(51) Int. Cl.
| | |
|---|---|
| *H01R 4/48* | (2006.01) |
| *H01R 13/17* | (2006.01) |
| *H01R 13/04* | (2006.01) |
| *H01R 13/11* | (2006.01) |
| *H01R 13/696* | (2011.01) |
| *H02H 3/08* | (2006.01) |

(52) U.S. Cl.
CPC ............... *H01R 4/48* (2013.01); *H01R 13/04* (2013.01); *H01R 13/11* (2013.01); *H01R 13/696* (2013.01); *H02H 3/085* (2013.01)

(58) Field of Classification Search
CPC .................................. H01R 4/48; H01R 13/17
USPC ........................................................ 361/93.8
See application file for complete search history.

(56) References Cited

U.S. PATENT DOCUMENTS

| | | |
|---|---|---|
| 2,997,685 A | 8/1961 | Anderson |
| 4,453,792 A | 6/1984 | Bright et al. |
| 9,231,326 B2 * | 1/2016 | Goesmann ............. H01R 13/17 |
| 2006/0073741 A1 | 4/2006 | Bommersheim |
| 2006/0223385 A1 | 10/2006 | Pavlovic et al. |
| 2013/0280946 A1 | 10/2013 | Salzmann et al. |

FOREIGN PATENT DOCUMENTS

| | | |
|---|---|---|
| DE | 10 2005 043 601 B4 | 3/2007 |
| DE | 10 2010 008 536 A1 | 8/2011 |
| DE | 10 2012 206 731 A1 | 10/2013 |
| WO | WO 84/03 130 A1 | 6/1984 |
| WO | WO 2004/086 567 A1 | 10/2004 |

OTHER PUBLICATIONS

Office Action dated Oct. 31, 2014 for German Patent Application No. 10 2014 004 431.9.

* cited by examiner

*Primary Examiner* — Dharti Patel

(74) *Attorney, Agent, or Firm* — Finnegan, Henderson, Farabow, Garrett & Dunner, LLP

(57) ABSTRACT

A connector component is disclosed. The connector may include an electrically-conductive clamp element configured to clamp a contact element to a surface element. The surface element may be electrically-conductive and may be inserted into the clamp element using a recess in a lateral edge of the surface element to provide additional surface area for an electrical connection. The clamp element may be a lamella contact. The surface element may be at least one contact blade. The clamp element may include two laterally-spaced clamp elements. The connector component may also include a contact element that is inserted into the two clamp elements.

13 Claims, 3 Drawing Sheets

CONNECTOR WITH CLAMP ELEMENT

CROSS-REFERENCE TO RELATED APPLICATION

This application is based upon and claims the benefit of prior German Application No. 10 2014 003 113.6, filed on Mar. 11, 2014, the entire contents of which are incorporated herein by reference.

TECHNICAL FIELD

The disclosure relates to a connector component having at least one electrically conductive, spring clamp element. The disclosure furthermore relates to a connector having said connector component part, as well as a complementary connector component part. The connector may be in particular developed as a high-current contact.

BACKGROUND OF THE INVENTION

Electrical connectors with a first male connector component part having a contact meter and a second female connector component part having a contact cage exist. Lear sells them as "MAK System." With the male connector component part, the contact blade is arranged in a plug connector collar. The contact cage has one or more contact springs that contact the contact blade by using a clamping fit. The contact springs may constrict the electrical current guided through them, which leads to increased ohmic losses, for example. Furthermore, the clamp fit increases thermal resistance, which may facilitate a poor thermal discharge. Furthermore, higher mechanical stress may lead to breakdowns in the electrical connection due to lift-offs or twisters.

Lamella contacts are described in WO 2009/062469 A2. In particular, so-called "dLAM lamella contacts" by dConn Connection Technology GmbH & Co. KG exist. By packing the lamellae, the dLAM lamellae contact can be adapted individually to a particular current load. At the same time, the dLAM lamellae contact may have a high thermal resistance and can be used at up to 170° Celsius. Due to a high normal contact power, it maintains contact during vibrations.

SUMMARY

One object of the present disclosure is to overcome at least some of the disadvantages of the other connectors and, in particular, to provide an electrical connection that is simple in construction and contact-safe. For example, a connector that may be used in high-current connections with low electrical and/or thermal resistance may be disclosed.

A connector component part that has at least one electrically conductive, resilient clamp element and at least one electrically conductive contact surface element, which is inserted into to the at least one clamp element may facilitate the objects discussed above.

The at least one clamp element may press a surface contact element of a complementary connector component part, which may have been inserted into said connector component part, flatly onto at least one contact surface element of said connector component part. This arrangement may result in a large-surface contact with a capacity to carry high amounts of current and an effective thermal link. A constriction of the electrical and thermal current may be avoided. Furthermore, the connection may be redundant in that current can flow via the planar contact surface elements and the clamp elements. Liftoffs and twisters may be avoided with this design. Furthermore, because the connection secures two-dimensional contact, silver-plating may not be necessary.

The contact surface element being inserted into the at least one clamp element may indicate that surface element may be in an area of the at least one clamp element where the clamp element can clamp the contact surface element.

In the following, the connector component part may be referred to as the "first" connector component part. Also, the contact surface element may be referred to as the "first" contact surface element. The complementary connector component part may be referred to as the "second" connector component part, and its contact surface element may be referred to as the "second" contact surface element.

The first connector component part may also have a connector housing in which at least one clamp element and at least one contact surface element are at least partially situated. The second connector component part may have a connector collar, for example, where the contact surface element may be located.

The first and/or the second connector component part may be designed for an electrical high-current connection.

The connector component part may also be referred to as a connector or connector element.

In one embodiment, the at least one clamp element may be provided by at least one lamella contact. The lamella contact may provide advantage simple and robust construction. Also, the second contact surface element may be easily inserted. A lamella contact may be shaped in a U-shape, with the open end of the contact facing the second connector component part. The lamella contact may have two lamellae or lamellae arms that may be separated by a recess and/or a gap. The lamellae arms may form the legs of the U-shape, and a bridge that connects the lamellae arms may for the base of the U-shape. The two lamellae arms may have bulges at their facing free ends. At least one of the lamellae arms may serve as a spring arm and be resiliently bent perpendicular to a direction of insertion, which may enlarge the gap of the arms. In an embodiment, both lamellae arms may be bent open in opposite directions perpendicular to the direction of insertion.

In an insertion process, a second contact surface element may slide between the lamellae arms and may be held using a normal contact force due to the elastic restoring force of the lamellae arms.

A contact surface element being inserted into a lamella contact may mean that the surface element is in the gap of the two lamellae. The surface element may rest on one of the two bulges of the lamellae. The contact blade may rest loosely on the bulges. In an embodiment, the contact blade may be firmly connected to the bulges. For example, the contact blade may be welded to the bulges.

The at least one lamella contact may be a stacked lamellae contact, such as a dConn lamella contact, for example.

In another alternative embodiment, band-shaped spring clips may be used as clamp elements. For example, steels springs, goblet-shaped spring brackets, or U-shaped spring brackets may be used as clamp elements. These types of clamps may be more economical to use. Whereas the two spring arms of the spring brackets may maintain a distance from one another over most of their length (e.g., a recess and/or a gap may extend between them), in the area of their two free ends through which the second contact surface element may be inserted by bending open the spring arms, the spring arms may rest on one another. In an embodiment, the spring arms may be spaced apart. The two free ends of the spring brackets may be bent to widen the spacing in order to simplify the insertion of the second contact surface element.

The contact surface element may be developed to have a planar contact surface. The planar contact surface may be a substantially two-dimensional contact surface. For example, the contact surface may be completely two-dimensional. However, a substantially two-dimensional contact surface may also be planar except for the presence of locally delimited functional areas, which may take up a small amount of the contact surface. In embodiments, the small amount of the surface that is not planar may not exceed 25%, 20%, 15%, 10%, 5%, or 2.5% of the total contact surface. The functional areas may be used exclusively for exercising at least one function other than power transmission. In an embodiment, the functional areas may be used for power transmission.

In one embodiment, the contact surface element may have on its contact surface at least one locking area. For example, at least one locking projection (e.g., a spring- or plug-like projection, a ball cup-shaped projection, etc.) and/or at least one locking recess (e.g., a groove, a ball cup-shaped recess, etc.) may be located on the surface of the contact surface element. The first contact surface element and the second contact surface element may have complementary or matched locking areas so that one locking connection (e.g., a releasable locking connection) may be created by engaging the matched locking areas. This arrangement may provide haptic feedback indicating a successful inserting process. Also, the matched locking areas may act as an additional safeguard against undesired sliding apart. In one embodiment, the lock between the first contact surface element and the second contact surface element may be released against the direction of insertion by a sufficiently high tensile force.

The contact surface may run over the entire width of the contact surface element. In an embodiment, the contact surface element is a plate-shaped element, such as a band-shaped element to facilitate compact and economical construction.

The contact surface may be blank, for example, with a contact surface element made of copper. The contact surface element may also be coated with a deposit (e.g., silver), a mixture of silver and tin (e.g., an alloy made of silver and tin), or a mixture of silver, tin, and copper (e.g., an alloy of silver, tin, and copper).

In an embodiment, at least one contact surface element may be developed as at least one contact blade. This may facilitate a simple, robust electrical connection that transmits high currents. A simple insertion movement may be achieved with a convex front edge of the contact blade, which may be referred to as a "cutting blade edge." The edge of the blade may face the second connector component part that is inserted.

The contact surface element may also be provided as a contact tongue, contact tab, or contact lug.

The rear area of the contact surface element, which may face away from the second connector component part, may be manufactured as a connecting area to connect to an electrical conductor, such as a cable, for example. The connecting area may be a crimping area for crimping the electrical conductor, or a welding area for welding the electrical conductor.

In an embodiment, a first contact surface element, such as a contact blade, may be inserted into two laterally spaced clamp elements, such as lamella contacts. A second contact surface element (of the second connector component part) inserted therein may contact one of its flat sides two-dimensionally the first contact surface element. The other flat side of the second surface contact element may contact a respective arm of both clamp elements. This arrangement may provide a particularly effective safeguard against tilts of the contact surface elements relative to one another. The two-dimensional contact may be provided between the first contact surface element and the inserted second contact surface element. Furthermore, additional current paths may be provided via the two clamp elements.

In another embodiment, the clamp elements may be arranged in a direction of insertion of the first connector component part in an offset relative to one another. This may simplify the insertion process for a contact surface element to be inserted because the elastic restoring forces of the clamp elements do not have to be overcome all at once, but only successively.

In yet another embodiment, the first contact surface element may rest on the clamp elements. This may provide a smooth insertion of the second contact surface element.

In an embodiment, the contact surface element may rest firmly on the clamp elements or may be fastened to the clamp elements. The contact surface element may be fastened to the clamp element in a fixed-closed fashion. For example, the contact surface element and clamp element may be soldered or welded together. This may ensure that the second inserted contact surface element comes into contact only with the flat side of the first contact surface element of said connector component part which faces away from the flat side that rests on a lamella.

In another embodiment, the contact surface element may move freely back and forth between the two arms (e.g., lamellae) of the clamp elements (e.g., contact lamellae). For example, the contact surface element may be moved by one of the two arms of a clamp element into the direction of the other arm and back (e.g., by pivoting). This direction of movement may be perpendicular to the direction of insertion. This modification may result in a second inserted contact surface element can be guided along any flat side of the first contact surface element. Therefore, contact surface element may not be blocked during insertion.

In another embodiment, the two clamp elements may be connected using an assembly clamp. This connection may facilitate the insertion into a connector housing of the first connector component part.

In an embodiment, at least one clamp element may be inserted into a respective lateral recess of the at least one contact surface element. This may prevent a lateral projection of the clamp element. Furthermore, the recess can facilitate the positioning and/or stop relative to a movement of the clamp element in the direction of insertion.

When two clamp elements and one contact surface element are used, the two clamp elements can be inserted into recesses that are at opposite lateral edges of the contact surface element. With an offset arrangement of the clamp elements in the direction of insertion, the recesses may be led into the contact surface element in an offset fashion. For example, the lateral recess may be a notch or a punch-out.

In an embodiment, there may be an excess-current release at the contact surface element between the two recesses, which can be thermally activated and may cut the contact surface element. When excessive current flows through the contact surface element, the contact surface element may be cut by the electrical excess-current release, interrupting the current flow. A cross-section of the contact surface element may be the smallest between the two recesses, which may be where the highest temperatures occur at a given current flow. This may facilitate a safe triggering of the thermally activated excess-current release. A thermally activated excess-current release may be an excess-current release that activates when a predetermined temperature threshold is reached or exceeded.

In an embodiment, the thermally activated excess-current release may have at least one zinc layer between the two recesses. Compared to other metals, zinc, which has a melting point of 419.53° C. for pure zinc, may have a low melting point. If the melting point is reached, the excess-current release may activate by melting zinc.

In an embodiment, the contact surface element may consist of zinc or have a base body made of zinc. The base body may be coated with a material has increased electrical conductivity, such as a copper or silver layer, at contact areas to other conductive elements, such as the second contact surface element. If the melting point of the zinc is reached between the two recesses, the molten zinc may flow off of the contact surface element and leave a consistent gap.

In an embodiment, the thermally activated excess-current release may include a thermally activated excess-current release element. For example, the release element may be an insert element made of zinc. The insert element may be developed as a partial area of a contact surface element that may be located between the two recesses and otherwise consists of a higher melting material, such as copper. If the melting point of the zinc is reached between the two recesses, the molten zinc may flow out of the contact surface element and a gap may be created. If the contact surface element consists completely of zinc in sections between the recesses, the contact surface element may be completely severed. However, there may also be relatively thin webs of the higher melting material, which may be orientated along a longitudinal direction of the contact surface element for example, to increase mechanical stability and/or reduce an electrical resistance. With webs, if the zinc flows off, the remaining cross-section of material with a higher melting point between the two recesses may be so small that this material is also driven to its melting point or provide high ohmic resistance delimiting current flow. For example, the insertion element consisting of zinc may be welded to the material with the higher melting point.

In another embodiment, a tin soldering point may be applied between the recesses on a copper contact surface element. If the melting point of the tin is reached between the two recesses, the tin may combine with the copper to form bronze, even in the depth of the contact surface element. This lowers the local melting point and increases the specific resistance. Consequently, the bronze formed in this manner may also melt and therefore interrupt the contact surface element. This modification may be mechanically robust below the melting temperature of tin and may have an especially high conductivity.

In an embodiment, a connector with a first connector component part and a second connector component part, with the first connector component part being a connector component part as described above is used. The connector may have the same functionality as the first connector component part and can be developed in similar fashion.

In an embodiment, the second connector component part may have a second contact surface element, such as a contact blade.

In an embodiment, when the two connector component parts are in a connected state, at least a first contact surface element of the first connector component part may be in two-dimensional contact with at least a second contact surface element of the second connector component part.

In an embodiment, when the first connector component part (e.g., a first contact surface element) is inserted into two clamp elements that are spaced laterally from one another, the contact blade of the second connector component part may be clamped between the contact blade of the first connector component part and/or between the two lamellae contacts.

In an embodiment, the first connector component part may be a female connector component part and the second connector component part may be a male connector component part. The second connector component part may be developed as a male connector component part with a contact blade arranged in a connector collar.

The disclosed embodiments are further described in the detailed description below, which is explained in connection with the figures. For clarity, elements that are the same or have the same effect may have the same reference symbols.

DESCRIPTION OF THE EMBODIMENTS

Figure 1:
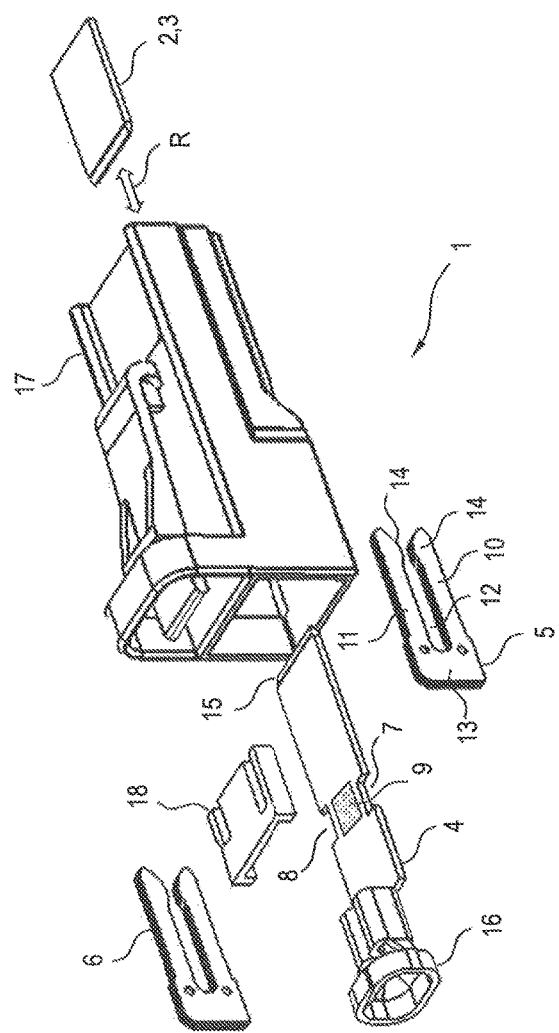
FIG. 1 shows an exploded view of a first connector component part and part of a second connector component part of a connector consistent with disclosed embodiments.

FIG. 1 shows a diagonal view of a first connector component consistent with embodiments of this disclosure. As depicted, first connector component part 1 and a second contact blade 3 of a second connector component part 2 may form a connection. The first connector component part 1 has a first contact blade 4, which can be inserted into two clamp elements formed of stacked dConn lamellae contacts 5 and 6. The lamellae contacts 5 and 6 are spaced laterally. For example, they may be orientated in parallel and arranged in a longitudinal offset with respect to a direction of insertion R. The direction of insertion R may also correspond to a longitudinal direction of the first connector component part 1 and the second connector component part 2, as well as their components. The lamellae contacts 5 and 6 are inserted into respective recesses 7 and/or 8 in a respective lateral edge of the first contact blade 4. The recesses 7, 8 are introduced into the contact blade 4 at a longitudinal offset according to a desired longitudinal offset of the lamellae contacts 5 and 6 relative to the direction of insertion R. The two contact blades 4 and 3 may consist of copper, for example.

Between the two recesses 7, 8 of the first contact blade 4, a thermally activated excess-current release element is applied as a tin soldering point 9. If excessive current flows through the area, it heats up to a temperature at which the tin soldering point 9 melts and the tin combines with the copper to form bronze between the two recesses 7, 8. Because bronze has a much higher specific electric resistance than copper and also has a lower melting point than copper, the temperature generated by the current flow further increases at that location until the bronze melts as well. The melting results in a continuous interruption of the first contact blade 4, which may not even be bridged by the lamellae contacts 5 and 6.

The lamellae contacts 5 and 6 are each essentially U-shaped, with their open end facing the second connector component part 2. They each have two lamellae arms 10, 11 that are separated by a recess and/or a gap 12. The lamellae arms 10, 11 form the legs of the U-form, and a bridge 13 that connects the lamellae arms 10, 11 forms the base of the U-form. The two lamellae arms 10, 11 have on their free ends facing bulges 14, between which the second contact blade 3 can be inserted. By inserting the second contact blade 3, at least one of the lamellae arms 10, 11 is resilient perpendicularly to the insertion- and/or removal direction R. For example, both lamellae arms 10, 11 can resiliently move in opposite directions perpendicular to the direction of insertion R.

The first contact blade 4 being inserted into the lamellae contacts 5 and 6 may mean that the first contact blade 4 is in the gap 12 of both lamellae contacts 5 and 6. For example, it may rest on one of the two bulges 14 of the lamellae arms 10, 11 of each of the two lamellae contacts 5, 6. The first contact blade 4 may rest loosely on the bulges 14 or be firmly connected to the same (e.g., welded).

A front blade edge 15 of the first contact blade 4 is orientated to protrude beyond the lamellae contacts 5 and 6 in the direction of the second connector component part 2, whereas a back end is developed as a connecting area 16 to fasten an electrical conductor (not shown) (e.g., a cable). The connecting area 16 may be a crimping area, for example, to crimp the electrical conductor, or a welding area to weld the electrical conductor.

The first contact blade 4 with the two lamellae contacts 5, 6 is inserted in a connector housing 17 that is open in the front and back. On that end, the lamellae contacts 5, 6 can be held together by means of an assembly clamp 18. On the front side, the first contact blade 4 and the two lamellae contacts 5, 6 may be laterally enclosed by the connector housing 17. In other embodiments, for example, the blade edge 15 of the first contact blade 4 may protrude from the back opening of the connector housing 17. The connecting area 16 may, for example, protrude from the back opening of the connector housing 17 to facilitate a simple fastening of an electrical cable thereto.

In an example embodiment, the first connector component part 1 is developed as a female connector component part to form the connector 1, 2. The second connector component part 2 then may be a male connector component part, with its second contact blade 3 being inserted or slid into the connector housing 17. The second contact blade 3 may be accommodated at least partially in a connector housing (not shown) (e.g., similarly to the MAK system).

Figure 2:
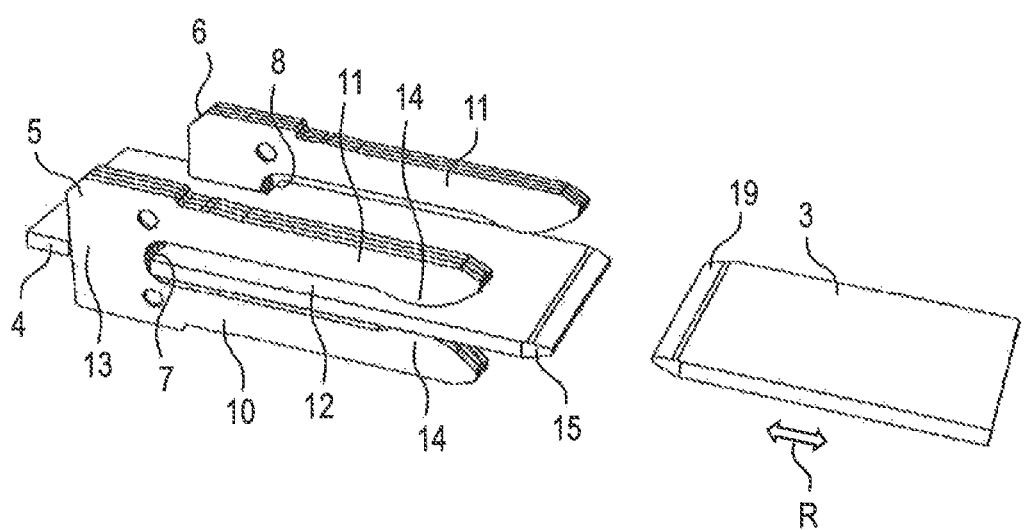
FIG. 2 shows lamellae contacts and a contact blade of the first connector component part with a contact blade of the second connector component part consistent with disclosed embodiments.

FIG. 2 shows a diagonal view of the lamellae contacts 5, 6 and the first contact blade 4 of the first connector component part 1 and the second contact blade 3 of the second connector part 2. As depicted, the second contact blade has not been inserted into said first connector component part. The contact blades 3 and 4 face each other. For example, the blade edge 15 of the first contact blade 4 and a blade edge 19 of the second contact blade 3 are opposite one another. The contact blades 3 and 4 are also arranged parallel to one another, but with a slight offset in height in such a manner that the second contact blade 3 points into the gap 13 above the first contact blade 4.

The width and the height of the contact blades 3 and 4 may be the same. However, matching dimensions may not be necessary. However, the second contact blade 3 may have a width greater than that of the first contact blade 4.

Figure 3:
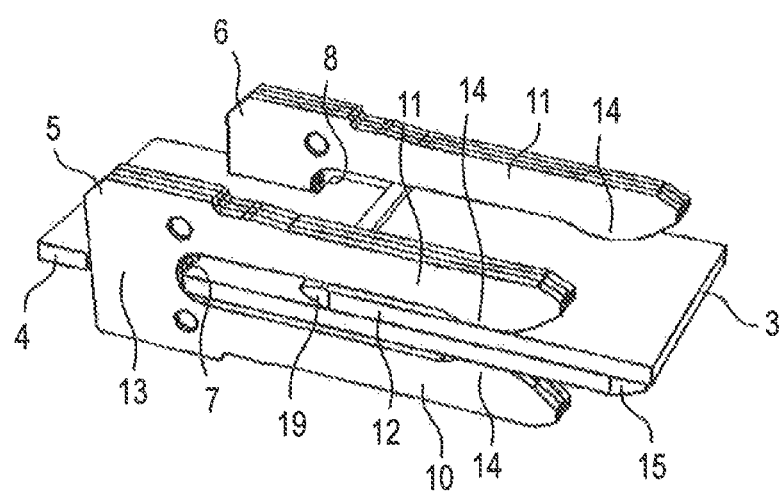
FIG. 3 shows lamellae contacts and a contact blade of the first connector component part with a contact blade of the second connector component part, and an inserted contact blade of the second connector component part consistent with disclosed embodiments.

FIG. 3 shows a diagonal view of the lamellae contacts 5, 6 and the first contact blade 4 with the contact blade 3. As depicted, the first contact blade 4 is inserted in the insertion direction R. In the connected state of the two connector component parts 1, 2, the first contact blade 4 is clamped between the second contact blade 3 on one side and the bulges 17 of the two lamellae contacts 5, 6 on the other side. Consequently, a flat side of the second contact blade 3 rests two-dimensionally on a flat side of the first contact blade 4. The other flat side of the second contact blade 3 rests on the two bulges 19.

The two-dimensional contact of the two contact blades 3, 4 provides reduced electrical and thermal contact resistance and/or prevents pinching of an electrical and thermal current. Furthermore, a plurality of current paths may form between the contact blades 3 and 4. For example, current paths may form directly via the contact blades 3, 4 and the respective lamellae contacts 5, 6. This prevents a disruption of current under increased mechanical stresses, such as lift-offs and twisters.

The present invention is not limited to the shown embodiment.

For example, the contact blades 3, 4 also can have matching locking areas.

As discussed in this disclosure, "one" can mean singular or plural, in particular in terms of "at least one" or "one or a plurality", etc., as long as this is not explicitly stated, for example by using the term "exactly one", etc.

Furthermore, a stated number may comprise the stated number as well as a common tolerance range as long as this is not explicitly stated.

LIST OF REFERENCE SYMBOLS

1 First connector component part
2 Second connector component part
3 Second contact blade
4 First contact blade
5 Lamella contact
6 Lamella contact
7 Recess
8 Recess
9 Tin soldering spot
10 Lamella arm
11 Lamella arm
12 Gap
13 Web
14 Bulge
15 Blade edge of the first contact blade
16 Connecting area
17 Connector housing
18 Assembly clamp
19 Blade edge of the second contact blade
R Direction of insertion

What is claimed is:
1. An electrical connector component, comprising:
an electrically-conductive clamp element formed of a plurality of lamella elements arranged to form a stack;
an electrically-conductive surface element configured to be inserted into the clamp element; and
an electrically-conductive contact element configured to be inserted into the clamp element
wherein the clamp element, after insertion of the surface element and the contact element into the clamp element, is configured to clamp an electrically-conductive contact element to the surface element in a clamp position, such that each of the plurality of lamella elements are electrically coupled to both the contact element and the surface element in the clamp position.

2. The connector component according to claim 1, wherein the surface element is at least one contact blade.

3. The connector component according to claim 2, wherein
the clamp element comprises two laterally-spaced clamp elements; and
the contact element is inserted into the two clamp elements.

4. The connector component according to claim 3, wherein the two laterally-spaced clamp elements are offset relative to one another with respect to a direction of insertion of the contact element into the two laterally-spaced clamp elements.

5. The connector component according to claim 4, wherein the surface element contacts the two laterally-spaced clamp elements.

6. The connector component according to claim 5, wherein the two laterally-spaced clamp elements are secured to either side of the surface element by an assembly clamp.

7. The connector component according to claim 6, wherein the two laterally-spaced clamp elements are inserted into two respective recesses in opposing lateral edges of the surface element.

8. The connector component according to claim 7, further comprising a current release component, located between the two respective lateral recesses of the surface element, wherein the current release is configured to be activated when a current through the connector component exceeds a predefined threshold, and wherein the current release allows for the release of current to ground when activated.

9. The connector component according to claim 8, wherein the current release is configured to be thermally activated at a predefined temperature threshold.

10. A connector comprising:
a first connector component, comprising:
an electrically-conductive clamp element formed of a plurality of lamella elements arranged to form a stack; and
an electrically-conductive first contact element; and
a second connector component configured to be connected to the first connector component, comprising:
an electrically-conductive second contact element,
wherein the clamp element is configured to clamp the first contact element to the second contact element in a clamp position, such that each of the plurality of lamella elements are electrically coupled to both the first contact element and the second contact element in the clamp position, and wherein the first contact element is in two-dimensional contact with the second contact element in the clamp position.

11. The connector according to claim 10, wherein the first connector component is a female connector component and the second connector component is a male connector component.

12. The connector according to claim 11, wherein the second contact element of the second connector component is a contact blade.

13. The connector component according to claim 12, wherein:
the clamp element comprises two stacks of lamella contacts;
the first contact element of the first connector component is a contact blade; and
the contact blade of the second connector component is clamped between the contact blade of the first connector component and the two lamellae contacts.

* * * * *